(12) United States Patent
Boeck

(10) Patent No.: US 7,220,097 B2
(45) Date of Patent: May 22, 2007

(54) GAS TURBINE APPARATUS WITH ACTUATORS TO COUNTERACT DEFORMATIONS OF HOUSING

(75) Inventor: Alexander Boeck, Kottgeisering (DE)

(73) Assignee: MTU Aero Engines GmbH, Munich (DE)

(*) Notice: Subject to any disclaimer, the term of this patent is extended or adjusted under 35 U.S.C. 154(b) by 0 days.

(21) Appl. No.: 11/294,859

(22) Filed: Dec. 5, 2005

(65) Prior Publication Data

US 2006/0120851 A1 Jun. 8, 2006

(30) Foreign Application Priority Data

Dec. 4, 2004 (DE) .................... 10 2004 058 487

(51) Int. Cl.
*F01D 25/28* (2006.01)
*F01D 11/20* (2006.01)

(52) U.S. Cl. ................. 415/14; 415/173.2; 415/173.3; 415/213.1

(58) Field of Classification Search ................. 415/14, 415/128, 171.1, 173.3, 196, 213.1
See application file for complete search history.

(56) References Cited

U.S. PATENT DOCUMENTS 4,343,592 A * 8/1982 May ................. 415/173.2

* cited by examiner

*Primary Examiner*—Richard A. Edgar
(74) *Attorney, Agent, or Firm*—W. F. Fasse; W. G. Fasse

(57) ABSTRACT

A gas turbine apparatus includes a compressor and/or a turbine, having rotor blades mounted on a rotor that is rotatable relative to a stationary housing, with a clearance gap between the rotor blades and the housing. During operation, external forces tend to deform the housing and the clearance gap. At least two actuators are arranged circumferentially offset from one another about the circumference of the housing. Each actuator is coupled to the housing and adapted to apply onto the housing a rotational moment about a torque axis that is at least approximately parallel to the housing axis. Based on the signal of a sensor that senses the deformation, a regulating unit actuates the actuators so as to counteract or compensate any deformations of the housing that arise during operation of the apparatus.

19 Claims, 3 Drawing Sheets

GAS TURBINE APPARATUS WITH ACTUATORS TO COUNTERACT DEFORMATIONS OF HOUSING

PRIORITY CLAIM

This application is based on and claims the priority under 35 U.S.C. §119 of German Patent Application DE 10 2004 058 487.7, filed on Dec. 4, 2004, the entire disclosure of which is incorporated herein by reference.

FIELD OF THE INVENTION

The invention relates to a turbomachine such as a gas turbine engine, especially an aircraft engine, generally including a compressor and a turbine that each include running vanes or rotor blades that are rotatable together with a rotor, as well as guide vanes or stator blades that are stationary and fixed to a stationary housing or casing.

BACKGROUND INFORMATION

Various types of turbomachines are known, and generally include rotor blades mounted on a rotor that is rotatable within a stationary casing or housing. A particular example of a turbomachine is a gas turbine engine, such as an aircraft engine, which typically includes a combustion chamber, at least one compressor, and at least one turbine. Each compressor and each turbine of the gas turbine apparatus or turbomachine includes a set of running vanes or rotor blades that are rotatable together with the rotor, as well as a set of stationary guide vanes or stator blades that are secured to the stationary casing or housing of the turbomachine. The rotor rotates together with the rotor blades relative to the stationary housing and the stationary stator blades, whereby circumferentially extending gaps are formed between the rotor and the stator, to allow clearance and thereby avoid grazing or collision between the rotor and the stator. For example, respective gaps are formed radially between the rotor and the radially inner ends of the stationary stator blades, and radially between the stationary housing and the radially outer ends of the rotating rotor blades. In order to minimize gas leakage past the rotor blades or stator blades through these gaps, and thereby to optimize the efficiency of the gas turbine apparatus, these gaps must be maintained as small as possible while avoiding grazing or collision of the relatively moving components. Also, various seal arrangements are typically provided in the gaps.

During operation, gas turbines are subjected to considerable mechanical loads, which can lead to a deformation of the housing of the compressor or the turbine out of its nominal circular sectional shape to an oval, oblong, generally square or polygonal, or other non-circular deformed shape. Such deformations can include temporary short-lived deformations that may be vibrational, cyclical, non-cyclical or non-repeating. Such deformations may also include relatively long-duration or on-going deformations. For example, with regard to an aircraft engine, various such deformations are caused, among other things, by the particular installation situation of the engine suspension, and through external forces being applied to the engine or its suspension, for example as a result of flight maneuver loads. Especially in the case of a single-walled housing for the compressor and the turbine, these deformations of the housing directly cause deformations of the inner housing wall surface, thus directly giving rise to deformations of the clearance gaps that are to be sealed between the rotor and the stator.

In order to counteract or reduce the influence of such deformation effects, according to the prior art, the housing of the compressor and the turbine is thickened, stiffened, or otherwise strengthened to resist the deformation, which, however, leads to an increased weight of the gas turbine apparatus. Moreover, due to such a stronger and heavier housing of the gas turbine apparatus, the costs are increased and the operating efficiency of the gas turbine is decreased. These disadvantages are especially significant for an aircraft engine.

SUMMARY OF THE INVENTION

In view of the above, it is an object of the invention to provide a turbomachine or gas turbine apparatus that can avoid, reduce, or minimize the occurrence of housing deformations that deform the gap between the rotor and the stator. It is a further object of the invention to achieve this without needing to make the housing stronger and heavier, and without requiring a double-walled housing. Still a further object of the invention is to achieve an active regulating and counteracting of housing deformations of a gas turbine apparatus. The invention further aims to avoid or overcome the disadvantages of the prior art, and to achieve additional advantages, as apparent from the present specification. The attainment of these objects is, however, not a required limitation of the claimed invention.

The above objects have been achieved according to the invention in a turbomachine or gas turbine apparatus including a compressor and/or a turbine including rotor blades on a rotor that is rotatable relative to a stationary housing, and preferably further includes stationary stator blades that are secured to the housing. In the inventive apparatus, at least two actuator arrangements that each respectively include at least one actuator are arranged offset or displaced from one another around the circumference, and are connected to a housing of the apparatus, e.g. the housing of the compressor and/or the housing of the turbine. Each one of the actuators is arranged and coupled to the housing so as to apply to the housing a rotational moment or torque about a torque axis that extends at least approximately parallel to the center axis of the housing. In this regard, the term "at least approximately parallel" means closer to parallel than to any of the axes orthogonal to the housing axis. In other words, most generally, the term "at least approximately parallel" means less than 45° divergent from parallel, but preferably it means less than 20° divergent from parallel, or more preferably less than 10° divergent from parallel, or especially preferably less than 5° divergent from parallel, or even essentially exactly parallel.

With the arrangement of actuators according to the invention, the actuators apply or exert onto the housing a rotational moment or torque so as to compensate or counteract any deformations arising in the housing during operation of the gas turbine apparatus. In other words, the actuators apply the appropriate rotational moments to the housing so as to exactly compensate or at least counteract and thereby reduce the deformations that arise from other influences during the operation of the gas turbine apparatus. In this regard, the deformations are detected on a continuous ongoing or repetitive basis by suitably arranged sensors, for example sensors measuring the instantaneously existing gap spacing of the pertinent gaps between the rotor components and the stator components or the housing. The sensor output signals are evaluated by a regulating unit, which then provides appropriate actuation signals to the actuators in response to and dependent on the sensor output signals.

Thus, according to the invention, deformations of the housing of the compressor and/or the turbine can be compensated, evened-out, minimized or reduced through an active regulation of the actuators. Thereby, even for a thin-walled housing, the required gaps between a rotor and a stator of a compressor and/or of a turbine can be maintained at the minimum gap spacing.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF PREFERRED EXAMPLE EMBODIMENTS AND OF THE BEST MODE OF THE INVENTION

Figure 1:
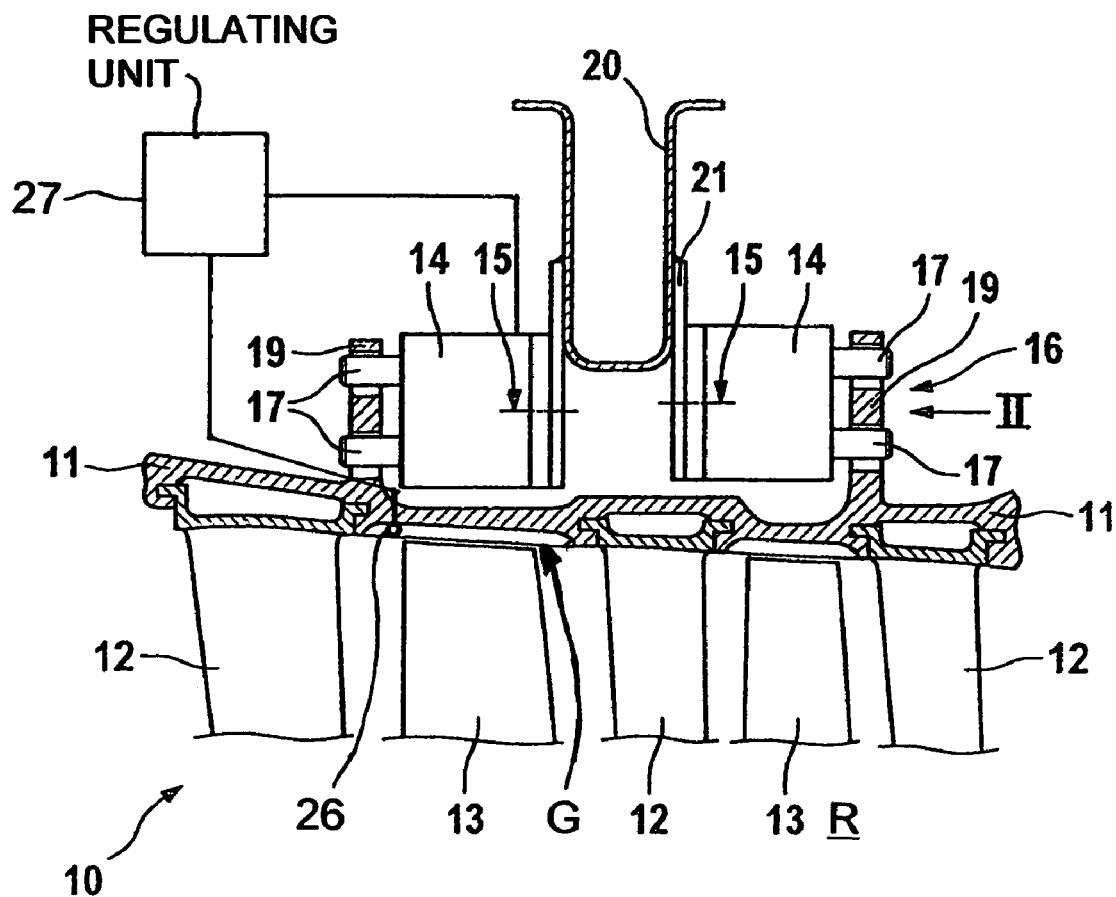
FIG. 1 is a partial lengthwise or axial section through a portion of a compressor of a gas turbine apparatus according to the invention.

FIG. 1 shows a partial lengthwise section through a compressor 10 of a gas turbine apparatus. The compressor 10 comprises a stationary or non-rotating housing 11 as well as a rotor R that is rotatable about a central axis A (see FIGS. 4 to 6) of the apparatus. Furthermore, the apparatus includes stationary guide vanes or stator blades 12 mounted on and supported by the housing 11, as well as moving vanes or rotor blades 13 that are supported on and rotate together with the rotor R relative to the stationary housing 11 and the stationary stator blades 12. Respective clearance gaps G are formed between the radially outer ends of the rotor blades 13 and the adjoining inner wall of the casing or housing 11, and also between the radially inner ends of the stator blades 12 and the adjacent surface of the rotor R. These gaps G allow the relative rotation of the components, without grazing or collision of the blades. However, the gaps G must be maintained as small as possible to avoid or reduce the leakage flow of gas through these gaps. Any conventionally known or future developed seal arrangements can be provided in these gaps G. Such seal arrangements do not form a part of the present invention, and are omitted from the drawings for the sake of clarity and simplicity.

During the operation of the gas turbine apparatus (e.g. embodied as an aircraft engine), the housing 11 can be deformed out of its nominal circular shape, for example due to flight maneuver loads that are transmitted into the housing 11 via the supporting structure that connects the gas turbine engine to the airframe of the aircraft. Such deformations of the housing 11 result in deformations of the clearance gaps G, which thus result in increased gas leakage or even a damaging impact of the rotor blades against the housing.

The present invention aims to reduce or eliminate such deformations by actively counteracting or compensating any deformations that begin to arise. In this regard, the apparatus further comprises at least two actuator arrangements that are allocated and coupled to the housing 11 at locations circumferentially offset or displaced relative to one another. Each one of these actuator arrangements comprises at least one actuator 14. Each actuator 14 is adapted to apply a rotational moment or torque to the housing 11 about a torque axis 15 that extends at least approximately parallel (e.g. within 10° of parallel) to the respective housing axis A, in order that the applied rotational moment or torque counteracts and compensates the housing deformations.

Each actuator 14 may be any conventionally known or future developed actuator, for example an electromechanical actuator, an electromagnetic actuator such as a solenoid actuator, an electrical actuator, a piezoelectric actuator, a hydraulic actuator, or the like, that is adapted and arranged to apply the required torque or rotational moment onto the housing 11. For example, instead of the illustrated example embodiment of the actuator 14, the actuator could be a linear stroke actuator acting on a pivot lever that pivots about the torque axis 15, or a rotatable actuator shaft that extends along the torque axis 15 and is rigidly connected to a pivot lever so as to pivot the pivot lever about the torque axis.

In the illustrated example embodiment of FIG. 1, each actuator arrangement comprises an actuator pair 16, namely including two of the actuators 14 arranged one behind the other in the axial direction. Moreover, at least two of such actuator pairs 16 are arranged circumferentially displaced from one another at at least two circumferential positions of the housing 11. Preferably, the actuator arrangements or actuator pairs 16 are distributed uniformly around the circumference of the housing 11. In the partial view of FIG. 1, only a single actuator pair 16 including two axially offset actuators 14 is visible, but at least one additional such actuator pair 16 is provided at another circumferential location of the housing 11.

In the present example embodiment according to FIG. 1, each actuator 14 comprises two actuator bolts, pins or studs 17 that protrude parallel to the torque axis 15. The two actuator studs 17 of each actuator 14 reach into and engage suitable openings or holes 18 in a flange 19 that is rigidly connected to (e.g. joined to or integrally formed with), and protrudes radially outwardly from, the housing 11. The flange can thus be considered to be a coupling lug or bracket that forms a pivot lever which pivots about the torque axis 15 as will be discussed below.

The other end of each actuator 14 opposite the actuator studs 17 is secured to a carrier or support structure 20 that extends in a circumferential direction at least partially around the housing 11. In the illustrated preferred embodiment, in this regard, the two actuators 14 of the respective actuator pair 16 are rigidly secured to (opposite sides of) the single common support structure 20 respectively via two rigid mounting plates or brackets 21. Furthermore, the respective actuator studs 17 of the two actuators 14 of each respective actuator pair 16 are respectively engaged and supported in respective holes 18 of respective flanges 19 on both sides of the support structure 20 in the axial direction. Thus, each actuator 14 is connected or coupled, on the one hand to a respective flange 19 secured to the housing 11, and on the other hand to the support structure 20 extending circumferentially around the housing 11. Thereby, the gas turbine apparatus, e.g. the illustrated compressor 10, is at least partially or entirely supported or suspended via the actuator pairs 16 from the support structure 20.

Figure 2:
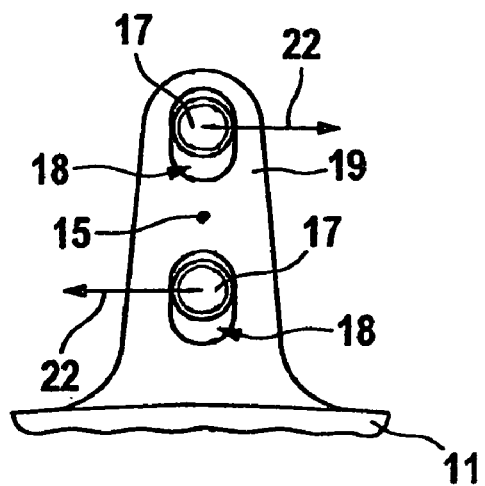
FIG. 2 is an axial end view in the direction II in FIG. 1, showing a detail of a portion of the apparatus according to FIG. 1.

As shown in FIGS. 1 and 2, the openings or holes 18 of the flange 19 in which the actuator studs 17 are engaged, are spaced apart from one another in the radial direction and are preferably configured as slotted or elongated holes extending in the radial direction. Due to this elongated shape of the holes 18 in the radial direction, any arising thermal expansion of the housing 11 is accommodated or compensated without problems.

As mentioned above, each one of the actuators 14 is adapted to apply or exert a rotational moment onto the housing 11 about the torque axis 15, in order to compensate or counteract any arising housing deformations. This is achieved in that the two actuator studs 17 of each actuator 14 apply two oppositely directed actuator forces 22 along respective effective actuation axes onto the flange 19 of the housing 11, as schematically indicated by the force arrows 22 in FIG. 2. Since these two actuator forces 22 are oppositely directed along effective actuation axes extending in the circumferential direction, and are effective at locations of the flange 19 radially offset on opposite sides of the torque axis 15, therefore the two forces 22 will cause a torque or rotational moment about the torque axis 15. Preferably, in the illustrated embodiment, the magnitude of the two actuator forces 22 is the same, but the two forces could alternatively have different magnitudes.

The rotational moments exerted on the flanges 19 in turn apply bending moments to the housing 11, which would tend to bend and deform the housing 11 out of its nominal circular cross-sectional shape. However, as will be explained below, the actuation of the actuators 14 is regulated so that the imparted bending moment forces tend to counteract and compensate the externally applied bending moment forces that would otherwise deform the housing 11 in an opposite manner, so that the resulting deformation is reduced or eliminated.

Figure 4:
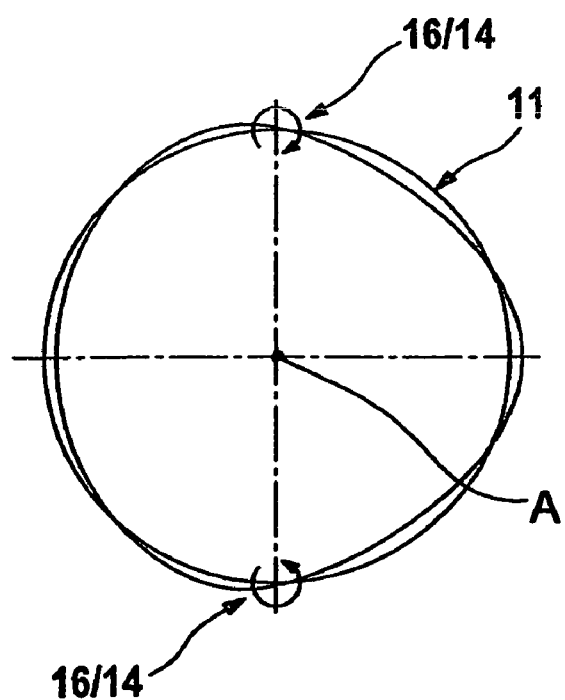
FIG. 4 is a schematic axial end view of the housing of a first embodiment of the inventive apparatus, for demonstrating the operating principle of the invention.

In one embodiment of this invention, two actuator arrangements and particularly two actuator pairs 16 are positioned and arranged at diametrically opposite locations about the circumference of the housing 11, for example as schematically indicated in FIG. 4. Each one of these diametrically opposite actuator pairs 16 includes two actuators 14 offset from one another in the axial direction, as described above. Preferably, the two diametrically opposite actuator pairs 16 generate and apply rotational moments or torques in opposite rotation directions about the respective torque axes thereof onto the housing 11. In the example of FIG. 4, the upper actuator pair 16 applies a torque in the clockwise direction, while the lower actuator pair 16 applies a torque in the counterclockwise direction. These torques would tend to deform the housing 11 out of its nominal circular shape in the manner schematically illustrated in FIG. 4. Particularly, the left side of the housing is drawn in and made flatter relative to the nominal circular shape, while the right side of the housing is bent at a sharper radius and bulged outwardly relative to the nominal circular shape. The actuators 14, however, are regulated in such a manner so that the deformation that would be caused by the applied actuator torques counteracts or compensates any deformation arising from other influences, such as externally applied forces arising from flight maneuver loads.

Figure 5:
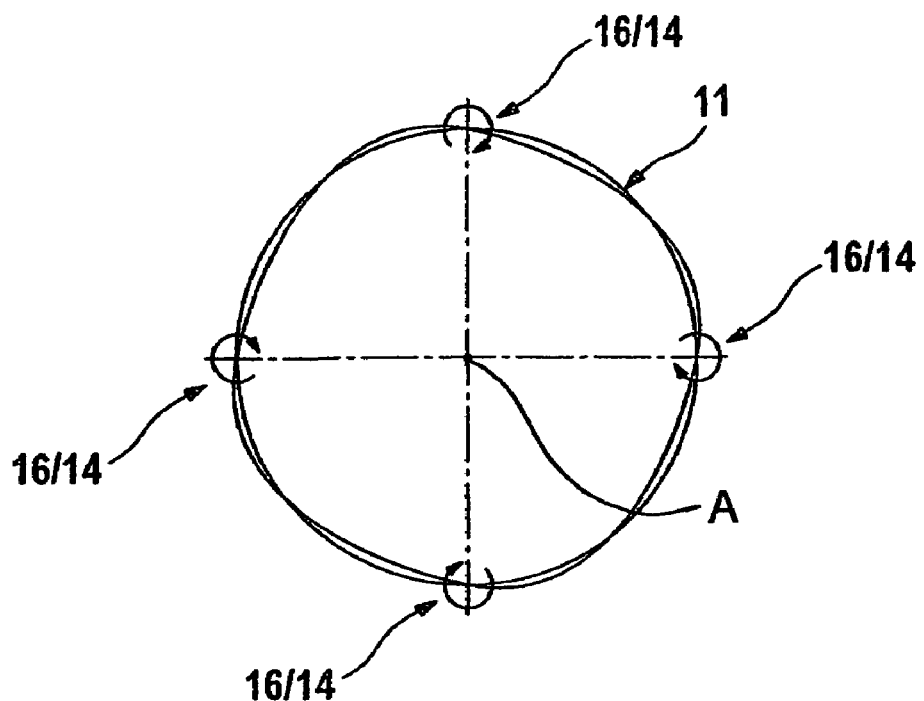
FIG. 5 is a schematic axial end view of the housing of a second embodiment of the inventive apparatus, for demonstrating the operating principle of the invention.
Figure 6:
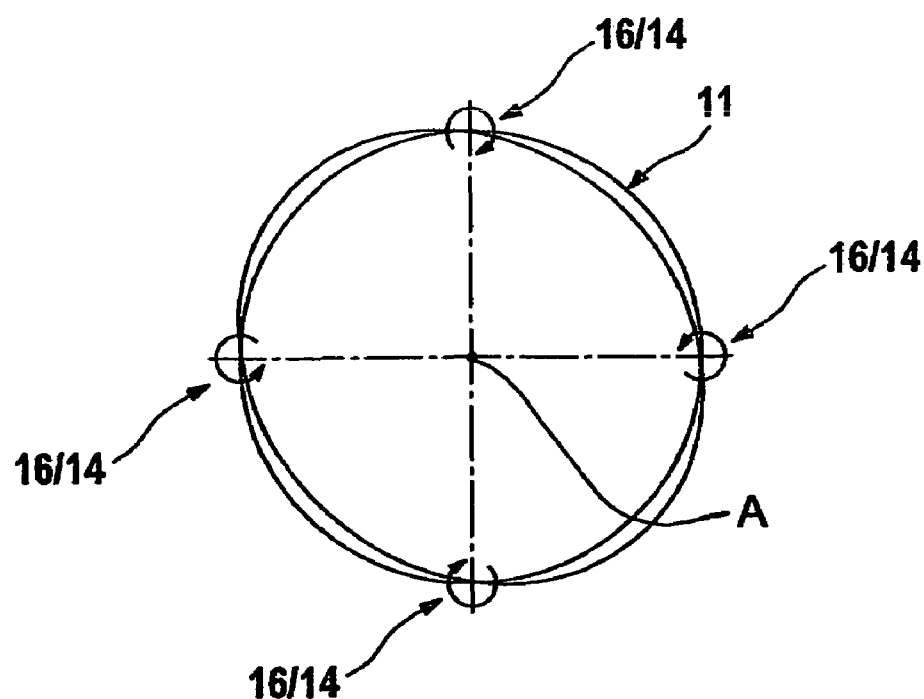
FIG. 6 is a schematic axial end view of the housing of a third embodiment of the inventive apparatus, for demonstrating the operating principle of the invention.

FIGS. 5 and 6 show further embodiments of the invention including four actuator pairs 16 uniformly distributed about the circumference of the housing 11, so that respectively two actuator pairs 16 are positioned diametrically opposite one another. Each actuator pair 16 comprises two actuators 14 as described above.

In the embodiment of FIG. 5, all of the actuator pairs 16 apply rotational moments or torques that act in the same rotation direction, e.g. in the clockwise direction as schematically illustrated. Thereby, in order to compensate arising deformations of the housing, the actuator pairs 16 can apply bending moments that tend to deform the housing generally into a square or quadratic shape, as indicated in FIG. 5.

On the other hand, in the embodiment of FIG. 6, diametrically opposite actuator pairs 16 apply torques in the same rotation direction, while the other two actuator pairs 16 apply torques acting in the opposite rotation direction. Particularly, in the illustrated example of FIG. 6, the upper and lower actuator pairs 16 apply torques in a clockwise direction, while the actuator pairs at the left side and the right side of the housing 11 apply torques in the counterclockwise direction. These torques give rise to bending moments that would tend to deform the housing 11 into an oval shape having its major axis extending diagonally from the upper left to the lower right, as schematically indicated in FIG. 6, so as to compensate or counteract the opposite deformation arising due to external influences.

While FIGS. 4 to 6 illustrate example embodiments having either two or four actuator pairs uniformly distributed about the circumference of housing 11, other embodiments are also possible, for example embodiments using three actuator pairs (or single actuators), or using more than four actuator pairs (or single actuators) uniformly distributed about the circumference of the housing 11. The selection of the number of actuators or actuator pairs as well as the arrangement and distribution thereof about the circumference of the housing 11 depend on the deformations of the housing that are expected to arise during the operation thereof and that are to be compensated in the manner of an active regulation by the actuators 14 or actuator pairs 16.

This active regulation is achieved by a regulation system cooperating with the actuators 14. As schematically indicated in FIG. 1, the regulation system preferably includes at least one sensor 26 that is arranged and adapted to measure, detect or sense any arising variation or deformation of the clearance gap G and/or more generally any deformation of the housing 11. The regulation system further includes a regulating unit 27, which may include a computer processor. A signal output of the sensor 26 is connected to an input of the regulating unit 27, which evaluates the provided sensor signals or measurement results and then generates suitable actuating signals dependent on and in response to these sensor signals or measurement results. The actuating signals are provided through an output of the regulating unit 27 to inputs of the actuators 14 so as to control the actuation of the actuators 14. Particularly, the actuators 14 are actuated so as to counteract or compensate any arising deformations of the housing 11 as described above, whereby this arrangement forms a regulation loop that tends to drive the deformation sensed by the at least one sensor 26 toward zero. The sensor 26, regulating unit 27 and actuators 14 are connected for signal transmission via any suitable signal transmission path, e.g. wire conductors, optical fibers, or wireless transmission links.

As already described above in connection with FIG. 1, all of the actuators 14 in this preferred embodiment are rigidly connected with the support structure extending circumferentially around the housing 11. In any embodiment of the invention including at least three actuators 14 or actuator pairs 16 preferably uniformly distributed about the circumference of the housing 11, it is not necessary to provide any other attachment or mounting of the housing 11 onto the support structure 20. In other words, in such embodiments, the actuators 14 or actuator pairs 16 provide a so-called self-centering support or suspension of the apparatus housing 11 relative to the support structure 20.

Figure 3:
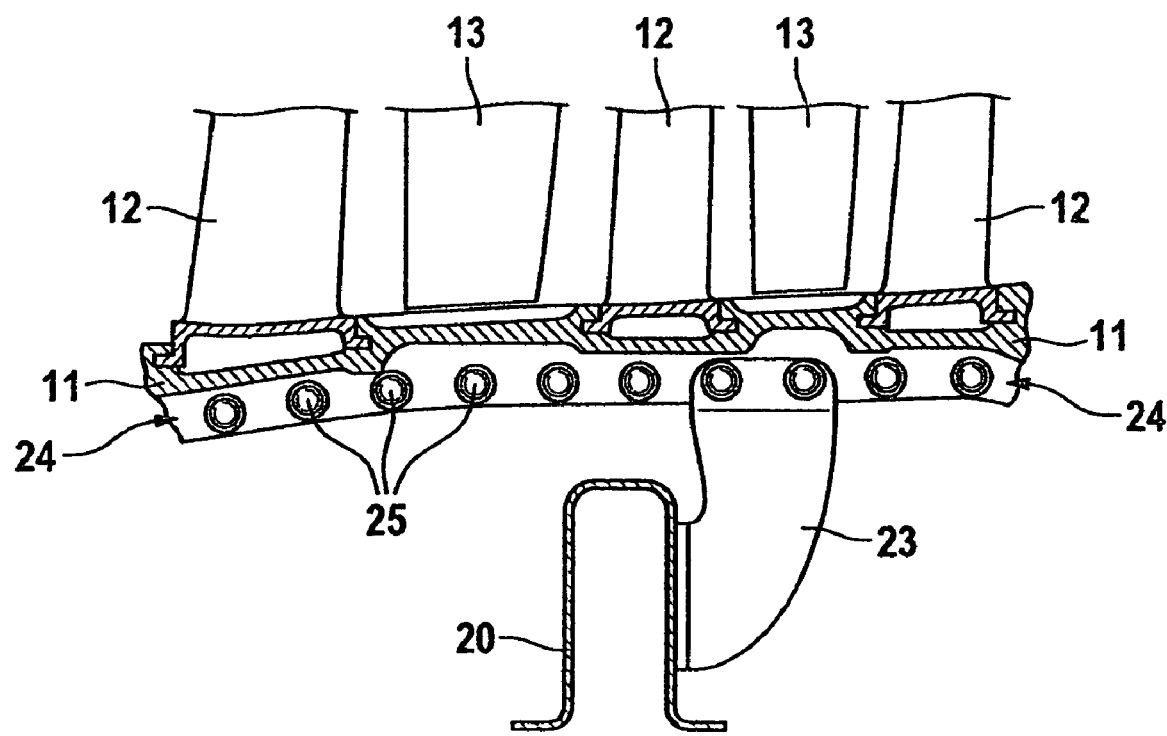
FIG. 3 is a partial lengthwise or axial section through a portion of the compressor of the inventive gas turbine apparatus according to FIG. 1, but at a different circumferential location from the view of FIG. 1.

On the other hand, in an embodiment in which only two actuators 14 or actuator pairs 16 are provided about the circumference of the housing 11, the housing 11 is additionally elastically connected to the support structure 20 via one or more elastic suspension members 23, for example as shown in FIG. 3. The elastic suspension member or members 23 provide additional suspension support of the gas turbine apparatus from the supporting structure 20, without interfering with the active deformation compensation provided by the actuators 14.

In the illustrated example of FIG. 3, the elastic suspension member 23 is connected to the housing 11 at a separation joint 24 of the multi-part or disassemblable housing 11. At such separation joints 24, the separate housing parts of multi-part housings are connected with one another by means of screwed or bolted connections 25. While this is a convenient and effective installation of the elastic suspension member 23, it is not mandatory, but instead the suspension member 23 could be connected at other locations of the housing. In the event of a one-piece housing, for example, the elastic suspension member 23 could be screwed or bolted onto a flange of the housing. The other end of the respective elastic suspension member 23 is secured to the support structure 20. The suspension member 23 may, for example, be a strap or flexible plate of rubber, an elastomer, a plastic, or a thin flexible metal, configured and arranged to provide elastic flexibility in the pertinent circumferential or torsional direction while still providing suspension support in the radial direction.

With the active regulated compensation or counteracting of housing deformations achieved by the inventive apparatus, it is possible to reduce or even eliminate the arising deformation of even a thin-walled housing during operation of the gas turbine apparatus. Thereby a small clearance air gap between the rotor and the stator can be maintained. As a result, the gas turbine apparatus has a low weight as well as a high efficiency.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A gas turbomachine arrangement comprising:
   at least one of a gas compressor or a gas turbine, having a housing, and having rotor blades mounted on a rotor that is rotatable within and relative to said housing about a central housing axis; and
   a first actuator arrangement including at least one first actuator and a second actuator arrangement including at least one second actuator, arranged circumferentially displaced from one another about a circumference of said housing;
   wherein each one of said actuators is respectively arranged and coupled to said housing so as to be adapted to apply to said housing a rotational moment about a respective torque axis that is at least approximately parallel to and radially outwardly displaced from said central housing axis.

2. The gas turbomachine arrangement according to claim 1, wherein each said respective torque axis is not more than 10° divergent from parallel to said central housing axis.

3. The gas turbomachine arrangement according to claim 1, wherein, relative to said central housing axis, each said respective torque axis is displaced radially outwardly from a housing wall of said housing.

4. The gas turbomachine arrangement according to claim 1, further comprising a sensor arranged and adapted to sense a deformation of said housing, and a regulating unit having an input connected to an output of said sensor and having an output connected to an input respectively of at least one of said actuators.

5. The gas turbomachine arrangement according to claim 4, wherein said regulating unit is adapted to produce at said output of said regulating unit an actuation signal in response to and dependent on a sensor signal provided by said sensor to said input of said regulating unit, and to regulate an actuation of said at least one of said actuators based on said actuation signal so that said rotational moment applied by said at least one of said actuators at least partially counteracts said deformation of said housing sensed by said sensor.

6. The gas turbomachine arrangement according to claim 1, further comprising a support structure extending at least partially around said housing, and plural mounting flanges connected to and protruding outwardly from said housing, wherein each one of said actuators is respectively coupled to a respective one of said mounting flanges and is respectively coupled to said support structure.

7. The gas turbomachine arrangement according to claim 6, wherein each one of said actuators is respectively rigidly connected to said support structure.

8. The gas turbomachine arrangement according to claim 6, further comprising at least one elastic suspension member interconnected between said housing and said support structure so as to elastically support said housing relative to said support structure.

9. The gas turbomachine arrangement according to claim 8, comprising a plurality of said elastic suspension members arranged at locations circumferentially displaced from one another and from said actuator arrangements about said circumference of said housing.

10. The gas turbomachine arrangement according to claim 6, excluding all connections between said housing and said support structure other than through said actuators, so that said housing is supported relative to said support structure entirely and exclusively through said actuators.

11. The gas turbomachine arrangement according to claim 6, wherein each said mounting flange respectively has two holes therein, and each said actuator respectively comprises two actuator output studs that respectively engage into said two holes of a respective one of said mounting flanges.

12. The gas turbomachine arrangement according to claim 11, wherein said two holes are respective elongated slot holes that extend longitudinally in a radial direction relative to said central housing axis.

13. The gas turbomachine arrangement according to claim 11, wherein said respective torque axis passes through said respective one of said mounting flanges at a point between said two holes thereof.

14. The gas turbomachine arrangement according to claim 11, wherein said actuator output studs are disposed at a first end of said respective actuator, and a second end of said respective actuator opposite said first end is connected to said support structure.

15. The gas turbomachine arrangement according to claim 6, wherein said first actuator arrangement comprises a first actuator pair including two of said first actuators displaced from one another in an axial direction along said respective torque axis thereof, said second actuator arrangement comprises a second actuator pair including two of said second actuators displaced from one another in an axial direction along said respective torque axis thereof, and both said actuators of each said actuator pair are respectively connected in common to said support structure and are respectively connected individually to respective axially offset ones of said mounting flanges.

16. The gas turbomachine arrangement according to claim 1, wherein said first actuator arrangement comprises a first actuator pair including two of said first actuators displaced from one another in an axial direction along said respective torque axis thereof, and said second actuator arrangement comprises a second actuator pair including two of said second actuators displaced from one another in an axial direction along said respective torque axis thereof.

17. The gas turbomachine arrangement according to claim 1, wherein said first and second actuator arrangements are arranged diametrically opposite one another about said circumference of said housing, and said rotational moments respectively of said first and second actuator arrangements are directed respectively in opposite rotation directions about said respective torque axes thereof.

18. The gas turbomachine arrangement according to claim 1,
further comprising a third actuator arrangement including at least one third actuator and a fourth actuator arrangement including at least one fourth actuator, arranged circumferentially displaced from one another about a circumference of said housing;
wherein said first and second actuator arrangements are arranged diametrically opposite one another about said circumference of said housing;
wherein said third and fourth actuator arrangements are arranged diametrically opposite one another about said circumference of said housing; and
wherein said rotational moments of said first and second actuator arrangements are both directed in a same first rotation direction about said respective torque axes thereof, and said rotational moments of said third and fourth actuator arrangements are both directed in a same second rotation direction about said respective torque axes thereof, with said second rotation direction being the same as or the opposite of said first rotation direction.

19. An aircraft engine arrangement for an aircraft, comprising:
a gas turbine engine including a housing, plural mounting flanges connected to and protruding outwardly from said housing, and a rotor that has rotor blades mounted thereon and that is rotatable within and relative to said housing;
a support structure extending at least partially around said housing; and
a plurality of actuators arranged circumferentially displaced from one another about a circumference of said housing;
wherein each one of said actuators respectively is connected to said support structure and respectively includes a mechanical actuator output member coupled to a respective one of said mounting flanges so as to be adapted to apply a torque to said respective mounting flange about a respective torque axis that lies on an axial plane on which said center axis extends and that passes through said respective mounting flange at a location displaced radially outwardly from said housing relative to said center axis.

* * * * *